J. E. RUBY.
ANIMAL TRAP.
APPLICATION FILED JAN. 5, 1915.
1,159,100.
Patented Nov. 2, 1915.
2 SHEETS—SHEET 1.
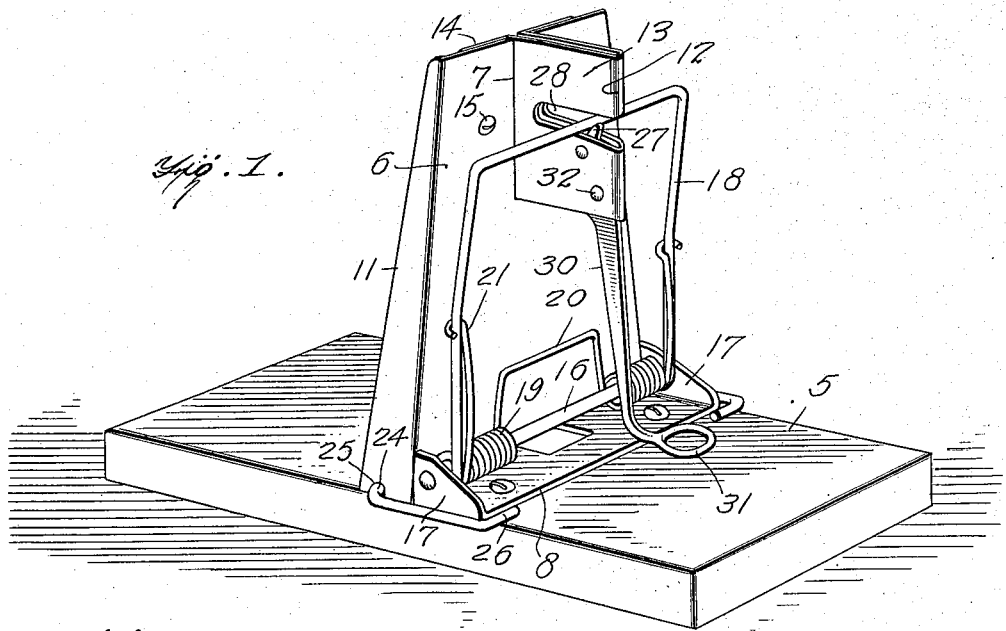
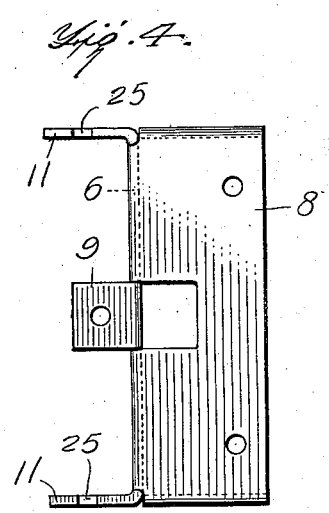
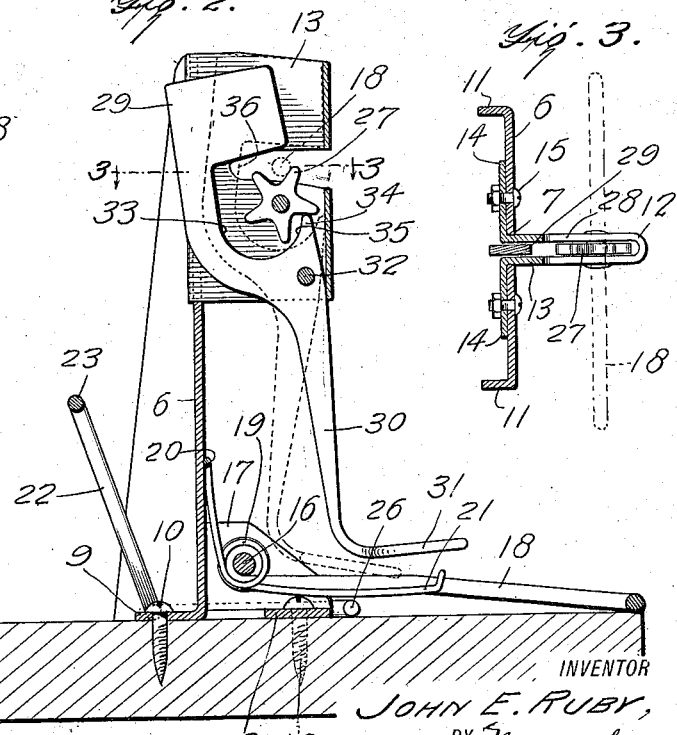
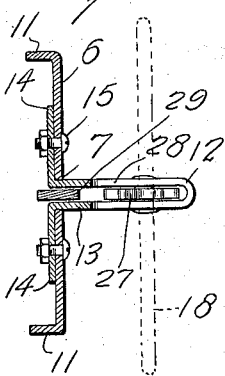
WITNESSES
INVENTOR
JOHN E. RUBY,
BY Munn & Co.
ATTORNEYS

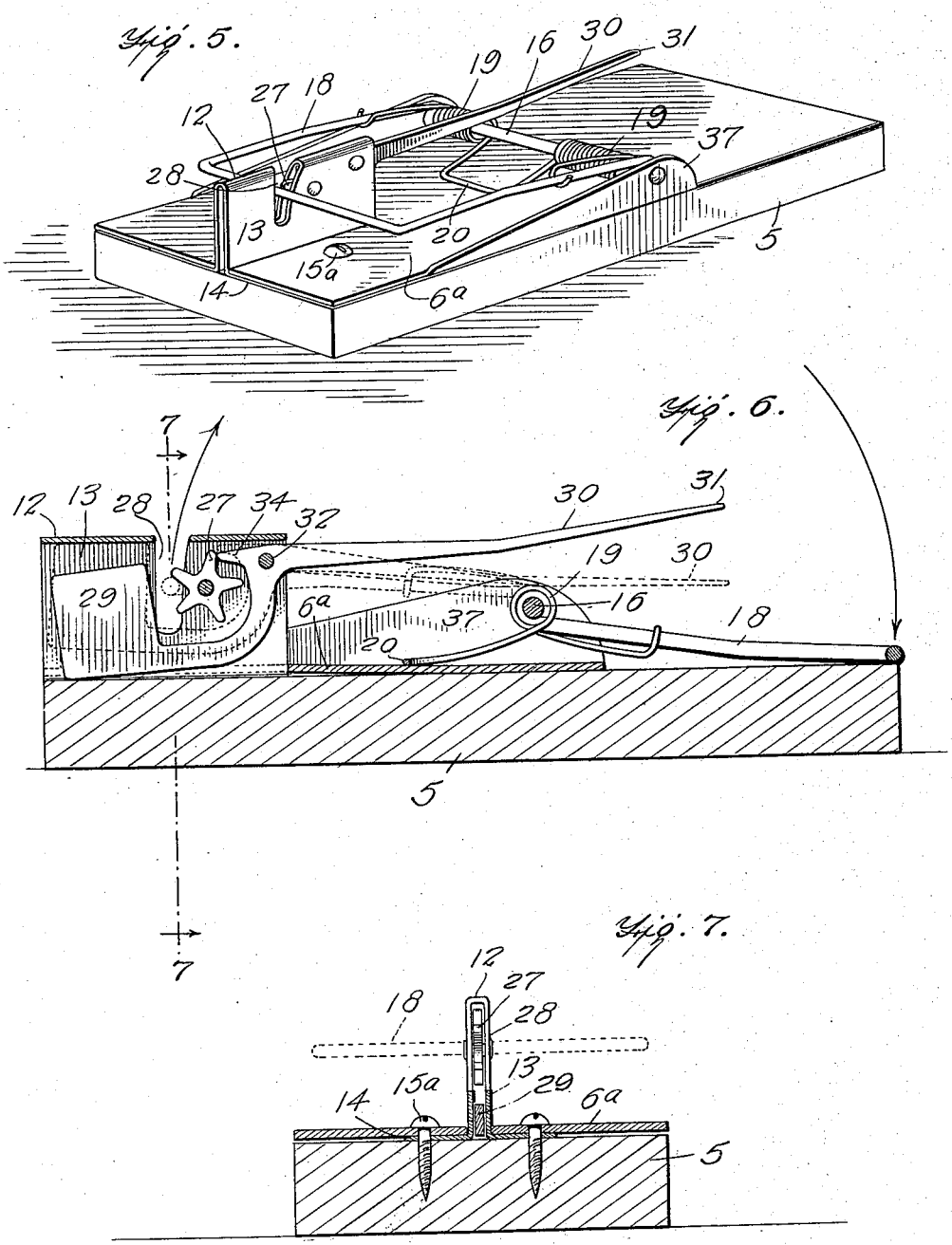

UNITED STATES PATENT OFFICE.

JOHN E. RUBY, OF INDIANAPOLIS, INDIANA.

ANIMAL-TRAP.

1,159,100.  Specification of Letters Patent.  Patented Nov. 2, 1915.

Application filed January 5, 1915. Serial No. 581.

*To all whom it may concern:*

Be it known that I, JOHN E. RUBY, a citizen of the United States, residing at Indianapolis, in the county of Marion and State of Indiana, have invented certain new and useful Improvements in Animal-Traps, of which the following is a specification.

This invention relates to an improvement in animal traps, and more particularly to the type disclosed in my prior Patent No. 1,116,127, issued November 3, 1914.

One of the principal objects of the invention is to provide an improved and particularly sensitive type of trigger mechanism of simple structure and arrangement, in traps of the type set out.

Another object of the invention is to provide a trap in which the trigger acts directly upon the dog or detent in releasing the trap jaw, at the same time being of such nature that automatic resetting of the trigger may be obtained by simply moving the jaw into its original or set position.

A further object of the invention is to provide an improved trap in which the parts are materially simplified, and in which by arranging the trigger to act directly upon the detent or dog, the usual releasing pin in traps of this type will be entirely eliminated, the trigger mechanism at the same time being increased in sensitiveness.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a view in perspective of a trap constructed according to my invention. Fig. 2 represents a view in vertical longitudinal section taken centrally of the trap. Fig. 3 represents a view in horizontal section taken on the plane indicated by the line 3—3 of Fig. 2. Fig. 4 represents a view in elevation of the standard or vertical plate, looking toward the bottom thereof. Fig. 5 represents a view in perspective of a trap presenting a modified arrangement of parts. Fig. 6 represents a view in vertical section taken longitudinally and centrally of the trap disclosed in Fig. 5, and Fig. 7 represents a view in vertical section taken transversely on the plane indicated by the line 7—7 of Fig. 6.

Referring more particularly to the first four figures of the drawings, it will be seen that in carrying out my invention I provide a base block or board 5 of rectangular or any other suitable configuration. Rising in a vertical plane transversely of the block is a standard in the form of a plate 6 having a vertical slot at 7 disposed centrally and at its upper end. By means of its right angularly bent lower edge 8 from which an oppositely bent ear 9 is stamped, the plate is connected through suitable fastening elements 10 to the block. Longitudinal tapering flanges 11 extending rearwardly from plate 6, that is in a direction opposite that in which the lower edge 8 extends, bear at their lower ends upon block 5 for bracing said plate.

A housing for the dog and the upper end of the trigger projects forwardly through slot 7. This housing is formed of a strip of suitable metal doubled upon itself as at 12 to form the side walls 13 of the housing. The latter are disposed in spaced and parallel relation to each other, and have their rear ends bent in opposite directions and at right angles as at 14 so as to lie against the rear face of plate 6 on opposite sides of slot 7. Fastening means 15, which pass through the plate and portions 14, serve to secure the housing in position.

A shaft 16 is supported horizontally above the block and in advance of and in spaced relation to the lower portion of plate 6, by means of a pair of upright lugs 17 formed at the ends of the section 8 of said plate. Upon this shaft is journaled the jaw or bail 18. It is substantially of a U-shape and may be formed of a length of stout wire bent into the proper configuration. The ends of the jaw are looped upon shaft 16 near lug 17 for journaling said jaw upon the shaft. A coiled spring 19 having its central portion bent outwardly to form a tongue 20 for bearing against plate 6, is interposed upon shaft 16 between the terminals of the jaw, and has its ends 21 extending outwardly and engaging upon the sides of the jaw in the manner indicated. The normal tendency of the spring is to maintain the jaw in the position indicated in full lines in Fig.

2, and said spring is placed under tension when the jaw is raised into the set position indicated in Fig. 1.

In order to facilitate the setting of the jaw either by hand or by foot, a setting lever indicated at 22 is provided. This lever is in the form of a length of stout wire bent at its central portion to provide a loop or arch 23 which is disposed behind the plate or standard 6. Between the arched portion and its ends, the sections of the lever are bent outwardly at 24 and pass through recesses 25 at the lower ends of flanges 11, so as to provide a journal for the setting lever. The ends of the wire forming the loop are then bent forwardly and inwardly at 26 to underlie the side portions of jaw 18. The arch or looped portion 23 lies in a plane substantially at right angles to the plane in which the remainder of the setting lever lies, so that when the jaw is in the position indicated in Fig. 2 the arched portion of the lever is elevated. By depressing the arch of the lever the jaw will be raised into the set position indicated in Fig. 1. Within the housing between the walls 13 thereof is rotatably journaled a dog or detent 27. The dog is in the form of a star or spur wheel, and is so disposed that its uppermost tooth or spur will project into a recess 28 provided in the housing. This recess lies in the path of movement of jaw 18, and said jaw moves into the recess when in set position. The arrangement is such therefore that one of the spurs of the dog lies in the path of movement of the jaw. The dog is disposed so that its spurs will project into recess 28 at a point removed somewhat from the rear end of the recess.

The trigger may be stamped from a strip of metal to provide an upper portion 29 from which a reduced tapering shank 30 depends. The shank projects downwardly and preferably terminates in a bait ring or other bait receiving element 31, disposed a short distance above base block 5. The trigger is pivoted near its forward edge to the housing as at 32, in such manner that the upper portion 29 is disposed within the housing. The portion of the trigger above pivot point 32 is somewhat heavier than the portion of the trigger below the pivot point, and by reason of the trigger being pivoted near its forward edge, the normal tendency of the upper portion is to swing and maintain the trigger in the position indicated in full lines in Fig. 2. By reason of the engagement of the forward edge of the trigger with the portion 12 of the housing, the tilting movement of the trigger due to the weight of its upper portion is limited so as to maintain said trigger in the position specified. This may be designated as the set position of the trigger.

The upper portion 29 is provided with a recess at 33 for the accommodation of the dog or spur wheel. The recess is large enough to allow free movement of the dog relatively to the trigger when the latter is in tripped position indicated in dotted lines in Fig. 2.

A stop 34 having a rounded upper edge is formed on the trigger at the forward portion of the latter, and occupies a position substantially in vertical alinement with pivot pin 32 of said trigger.

When the trigger is in set position, the stop 34 lies in the path of rotation of the spurs formed on the dog, so as to maintain the dog against movement in a clockwise direction according to Fig. 2. The edge of stop 34 toward the dog, is curved to provide a cam surface at 35, by contact of the spurs with which, the trigger will be moved when the spur wheel is turned in a counterclockwise direction, to allow the passage of the spurs beyond the stop. It will thus be seen that when the jaw is moved into setting position it will engage one of the spurs of the wheel as it enters slot 28, and will turn the wheel until the next subsequent spur is moved to the right and upwardly beyond stop 34, whereupon the trigger will settle back into the set position indicated in Fig. 2 to prevent clockwise movement of the spur wheel. Upon releasing the jaw from the pressure required to move it into set position said jaw will be in the position indicated in dotted lines in Fig. 2, that is behind the uppermost spur and will be pressing against said spur through the tension of the spring 19. It is thus evident that in order to set the trap it is simply necessary to move the jaw into setting position, at which time the spur wheel and trigger will co-act in such manner that the former will be engaged by the latter to maintain the jaw in set position. Previously to having set the jaw, the bait ring or other bait receiving element provided, will of course have been supplied with a suitable bait. Upon the animal's attempting to remove the bait, the pressure upon the lower end of the trigger will swing the same into the tripping position indicated in dotted lines in Fig. 2, thus swinging stop 34 out of the path of the spur wheel, and hence the latter will be rotated through the pressure exerted thereon by the jaw, and the latter will snap down into the full line position, thus killing the animal. By reason of the disposition of the weight of the trigger the latter will automatically fall back from the tripped into the set position. When the trigger is in tripped position however, the upper portion thereof at the back of the recess thereof and at a point indicated at 36 projects into slot 28 at the rear thereof. It is apparent therefore that should the trigger become stuck in tripped position, a movement of the jaw into setting position will cause the engagement of said jaw with the portion 36 of the trigger thus forcing the latter back into the full line or set position, whereupon a short reverse movement of the jaw into engagement with the spur wheel or dog, will force the spur wheel into engagement with the stop so as to automatically set the jaw.

In the modified arrangement indicated in Figs. 5, 6 and 7 no variations in structure of the trigger, dog, housing, jaw and spring, is indulged in. The operation of these parts is exactly similar to that already described. The main difference arises in the fact that the modified arrangement provides what might be termed a horizontal trap while the first arrangement is in the nature of a vertical trap. However, in the modified arrangement the plate 6ª which is secured upon block 5, is flat and is changed from the first form illustrated in so much that it is provided at its inner end with a pair of upstanding flanges 37, in which the shaft 16 is carried in spaced relation to the plate. The spring and jaw 19 and 18 respectively, are arranged upon the shaft in the same manner, and coöperate in the same manner as previously described. The trigger is arranged in a substantially horizontal plane, and the weight of the end 29 of the trigger tends to maintain the outer or bait receiving end thereof in an upward position, so that the trigger by its weight is automatically maintained in setting position similarly in the manner in which the trigger in Fig. 2 is maintained in set position.

To trip the trigger in the horizontal arrangement, the outer or bait receiving end thereof is pulled downwardly by the animal in attempting to extract the bait thus allowing the jaw to snap back from the set position indicated in Fig. 5 to the position indicated in full lines in Fig. 6. The automatic resetting of the jaw by simply moving it back into setting position is maintained in the same manner as that described with regard to Fig. 2. In the modified arrangement the retaining element 15ª corresponding to element 15 may be utilized in securing plate 6ª to base 5.

A trap constructed according to my invention will be extremely simple and compact and will be found to be extremely sensitive and positive in the operation of its trigger mechanism. My improved trap is simplified greatly in omitting the dog and the pin utilized in the trap forming the subject of the patent granted to me and previously referred to. However, the advantages which I obtained by the utilization of the above mentioned dog and pin are not lost, but are attained in the improvement by the peculiar construction of the dog and trigger, and by the direct co-action of said dog and trigger, in automatically setting the trap by simply moving the jaw into setting position as described.

Although I have described the preferred embodiment of my invention, I may desire to make such changes in the construction, combination and arrangement of parts thereof as do not depart from the spirit of the invention and the scope of the appended claims.

I claim:—

1. A trap including a base block, a plate rigidly disposed thereupon and provided at one end with a longitudinally extending slot, a housing projecting through the slot and provided with means whereby the plate and housing may be secured relatively to each other, a movable jaw associated with the plate, and a trigger mechanism partially maintained within the housing and adapted to coöperate with the jaw, substantially as described.

2. A trap including a plate, a housing associated with the plate and having a recess provided therein, a spring actuated jaw adapted to be moved into the recess in the housing in attaining set position, a spur wheel rotatably journaled between the walls of the housing in such position that its spurs are successively projected into the recess as the spur wheel is revolved, a trigger having a heavier portion projecting within the housing and a lighter bait receiving portion disposed without the housing, said trigger being pivoted within the housing at a point adjacent the spur wheel, a stop formed on the trigger and adapted when the trigger is in set position to engage the spur wheel for preventing rotation of the spur wheel in one direction, said trigger provided adjacent the stop with a cam surface adapted to be engaged by the spur wheel when rotated in an opposite direction, for momentarily moving the trigger out of set position to allow the passage of the spurs beyond said stop, said jaw when moved into the recess in attaining set position adapted to engage said spur wheel for rotating the same in said opposite direction, and adapted when in set position to engage one of the spurs of said wheel in order to be maintained in said position, substantially as described.

3. A trap including a plate, a housing carried thereby and having a recess, a spring actuated jaw movable into the recess in attaining set position, a detent having spurs rotatably journaled within the housing in such position that its spurs will successively project within the recess as the detent is rotated, a trigger partially housed within the recess and journaled at a point relatively to the detent, said trigger being heavier at one end than at the opposite end whereby to automatically be maintained in set position, a stop formed on the trigger and adapted when the trigger is in set position to prevent rotation of the detent in one direction, said detent adapted when rotated in the opposite direction to momentarily move said trigger out of set position to allow passage of the spurs beyond said stop, said jaw adapted to engage the detent for partially rotating the same in said opposite direction when moved into said recess for bringing one of the spurs into the return path of the jaw.

4. In an animal trap, a pivoted spur wheel, a pivoted trigger provided with a stop adapted to limit the movement of the spur wheel in one direction, said trigger having its weight so disposed as to maintain the trigger automatically in set position, a spring actuated jaw movable into engagement with said spur wheel for partially rotating the latter in the opposite direction as the jaw attains set position, to move a spur into the return path of the jaw, said spur wheel when rotated in said opposite direction adapted to momentarily move the trigger out of set position to allow passage of the spurs beyond said stop.

5. In an animal trap, a housing having a recess therein, a jaw movable into the recess in attaining set position, a pivoted trigger partially disposed within the housing and having a portion movable into the recess when the trigger is in tripped position, a rotatable dog pivoted relatively to the trigger and adapted to coact therewith in automatically restraining the jaw when moved into set position, said jaw adapted to engage the portion of the trigger projecting into the recess for moving said trigger into set position should the trigger become stuck in its tripped position.

6. In an animal trap, a rotatable dog having spurs, a rigid trigger pivoted adjacent the dog and normally maintained in set position and movable automatically into set position from tripped position, a spring actuated jaw adapted to engage said dog for partially rotating the same in attaining set position, to move a spur into the path of the jaw, and means carried by the trigger for restraining the dog against rotation under tension of the jaw when the latter is in set position.

JOHN E. RUBY.

Witnesses:
 Russi H. Hartman,
 Patrick J. Cahalane.

Copies of this patent may be obtained for five cents each, by addressing the "Commissioner of Patents, Washington, D. C."